United States Patent
Yamamoto et al.

(10) Patent No.: US 9,747,232 B2
(45) Date of Patent: *Aug. 29, 2017

(54) DATA PROCESSING DEVICE

(71) Applicant: DENSO CORPORATION, Kariya, Aichi-pref. (JP)

(72) Inventors: Hirofumi Yamamoto, Obu (JP); Tomoyoshi Funazaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 307 days.

This patent is subject to a terminal disclaimer.

(21) Appl. No.: 14/640,224

(22) Filed: Mar. 6, 2015

(65) Prior Publication Data

US 2015/0269101 A1    Sep. 24, 2015

(30) Foreign Application Priority Data

Mar. 19, 2014   (JP) .................................. 2014-56612

(51) Int. Cl.
G06F 13/372    (2006.01)
G06F 13/28    (2006.01)
G06F 13/40    (2006.01)
G06F 9/48    (2006.01)

(52) U.S. Cl.
CPC .......... *G06F 13/372* (2013.01); *G06F 9/4843* (2013.01); *G06F 13/28* (2013.01); *G06F 13/4022* (2013.01)

(58) Field of Classification Search
CPC . G06F 9/4843; G06F 13/4022; G06F 13/4004
See application file for complete search history.

(56) References Cited

U.S. PATENT DOCUMENTS

2012/0147016 A1    6/2012    Ishikawa et al.

OTHER PUBLICATIONS

"Access Scheme for Slotted Unidirectional Bus Configurations", IBM Technical Disclosure Bulletin, Apr. 1991, US, vol. 33, Issue No. 11.*
Yaremchuk, G. "A Novel Slotted-Ring Architecture for Parallel Processing: An Application." Electrical and Computer Engineering, 1994, vol. 2. pp. 486-489. (discussed on p. 2 of the specification).

* cited by examiner

*Primary Examiner* — Farley Abad
(74) *Attorney, Agent, or Firm* — Posz Law Group, PLC

(57) ABSTRACT

A data processing device includes: multiple data processing stages including a processing element, a stage memory and an event controller; and a bidirectional slotted bus connecting between the data processing stages, including two write only busses arranged at different data writing directions independently from each other. The processing element and the stage memory in one data processing stage are connected to each other via a read only bus. The processing element and the slotted bus are connected to each other via a write only bus. A process completion event is input from the processing element to the event controller, and an external event is input from an external device to the event controller. The event controller generates a task start event with respect to the processing element, according to each of the process completion event and the external event.

8 Claims, 13 Drawing Sheets

```
void array_add(int a[], int b[], int c[])
{
    int idx = TASK_ID;
    c[idx] = a[idx] + b[idx];
}
```

_US 9,747,232 B2_

DATA PROCESSING DEVICE

CROSS REFERENCE TO RELATED APPLICATIONS

This application is based on Japanese Patent Application No. 2014-56612 filed on Mar. 19, 2014, the disclosure of which is incorporated herein by reference.

TECHNICAL FIELD

The present disclosure relates to a data processing device having multiple data processing stages connected to each other via a slotted bus. Each data processing stage includes one or more processing elements.

BACKGROUND

When a hard ware device for executing a stream data processing such as an image processing is mounted, it is required not only to have excellent processing performance but also to have flexibility for handling various algorisms. To satisfy these requirements, a multi-core structure having multiple processing elements (i.e., PEs) is proposed.

For example, in non-patent literature No. 1, the PEs are connected to each other via a ring bus for writing only, and a memory corresponding to each PE provides a dual-port memory. Thus, a memory access operation from one PE and an access operation from other PE via the ring bus avoid a collision therebetween. An access operation for accessing a memory corresponding to the other memory via the ring bus is set to be an operation for writing only. Thus, a circuit construction is simplified.

In patent literature No. 1, each core processor includes multiple PEs, and the core processor corresponds to the PE in non-patent literature No. 1. Each core processor includes a frame memory as a common memory and multiple parallel memories having a memory capacity smaller than the frame memory therein. Thus, since multiple memories are prepared, a memory band, which decides a performance of the stream data processing operation, is improved.

In the stream data processing operation, as described in patent literature No. 1 and non-patent literature No. 1, a processing unit in each PE is assigned, and the data is transferred from one processing unit to another processing unit sequentially, so that a pipeline processing operation is performed. Here, in non-patent literature No. 1, in order to improve the processing performance, each PE has a multi-core structure. In this case, an access band of a dual port memory may be in short. Further, when the PEs are connected to each other via the ring bus, the designing degree of freedom for the pipeline structure may be restricted. Thus, when the data is transferred from one PE to another PE other than an adjacent PE, the access band for a whole of the ring bus may be restricted.

In patent literature No. 1, since the core processors are connected to each other via the dedicated bus, the designing degree of freedom for the pipeline structure is comparatively high. However, the access band is small, and the scalability is also small. Further, when multiple memories are arranged in the core processor, the structure of the hard ware device may be complicated, and the circuit dimensions increase. Furthermore, the operation speed is reduced, and the designing degree of difficulty in the software increases.

PRIOR ART LITERATURES

Patent Literature

Patent Literature 1: JP-2011-48579 A corresponding to US 2012/0147016 A1

Non Patent Literature

Non Patent Literature 1: Yaremchuk, G: A Novel Slotted-Ring Architecture for Parallel Processing, Electrical and Computer Engineering, 1994, 486-489 vol. 2

SUMMARY

It is an object of the present disclosure to provide a data processing device having a simple structure with high operation speed, and the data processing device executes various algorithms.

According to an aspect of the present disclosure, a data processing device includes: a plurality of data processing stages, each of which includes at least one processing element, at least one stage memory and an event controller; and a bidirectional slotted bus that connects between the data processing stages, and includes two busses, which are data write only busses and arranged at different data writing directions independently from each other. The processing element and the stage memory in one of the data processing stages are connected to each other via a read only bus. The processing element and the slotted bus in the one of the data processing stages are connected to each other via a write only bus. A process completion event is input from the processing element to the event controller in the one of the data processing stages, and an external event is input from an external device to the event controller. The event controller generates a task start event with respect to the processing element in the one of the data processing stages, according to each of the process completion event and the external event.

For example, assuming that the data processing device includes: two data processing stages, a first data processing stage processes the data, and the second data processing stage receives the processed data to execute another process using the processed data. In this case, the processing element in the first data processing stage reads out the data from the stage memory, and then, processed the data. Then, the first data processing stage transfers the processed data to the second data processing stage, which is connected to either one side of the first data processing stage, via the slotted bus connecting to the write only bus. Thus, the second data processing stage writes the data in the stage memory therein. Thus, since the task for processing data in the first data processing stage is completed, the completion of the task is generated as an event.

The event controller in the second data processing stage receives the event, which is generated at the first data processing stage in accordance with the completion of the task. Then, the event controller in the second data processing stage generates the task start event with respect to the processing element, so that the processing element starts to execute the task. Thus, the processing element reads out the processed data written in the stage memory, and executes another process. Thus, it is possible to synchronize the processing between two data processing stages.

Thus, the processing element in the first data processing stage reads out the data as a processing object from the stage memory via the read only bus, and processes the data. The processing element in the first data processing stage writes the processed data to the second data processing stage via the write only slotted bus. The data transfer direction between the processing element and the stage memory is specified, i.e., fixed. Further, the coherency management of the memory is performed such that the event controller generates the event with respect to the second data processing stage after the processing element writes the data in the memory of the second data processing stage. Thus, the area of the hardware is reduced, and the processing speed is improved.

Further, in the bidirectional slotted bus as a two-way slotted bus including two independent busses having different data writing directions, a structure for executing the pipeline processing of a software is constructed flexibly compared with a single direction ring bus described in non-patent literature No. 1. Accordingly, various algorisms are provided using the same hardware, and the hardware resource is effectively used. Further, the energy consumption is reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
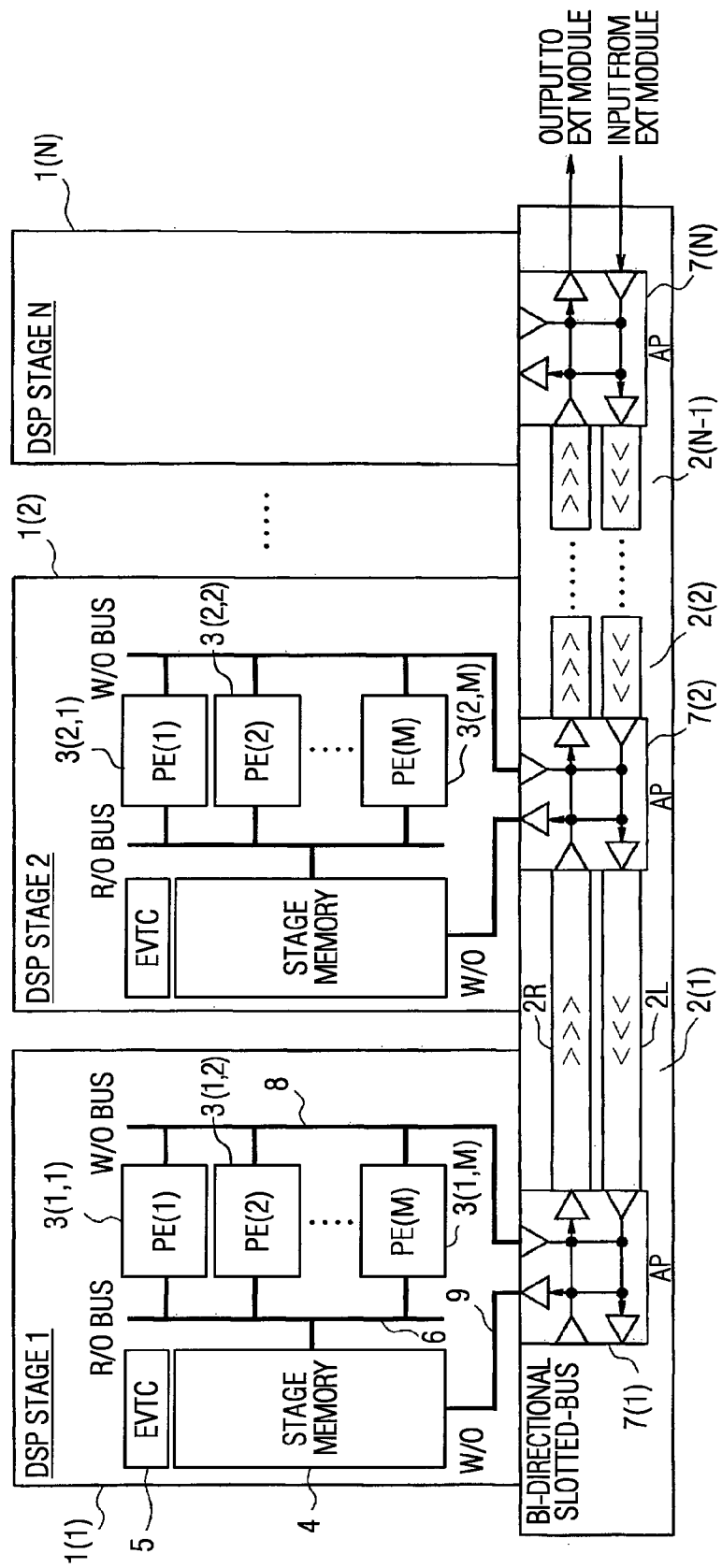
FIG. 1 is a block diagram showing a functional structure of a data processing device according to a first embodiment.

As shown in FIG. 1, a data processing device according to a first embodiment includes multiple digital signal processing stages 1(1), 1(2), . . . 1(N), which are connected to each other via a slotted bus 2(1), 2(2), . . . 2(N-1). Here, the digital signal processing stage 1(1), 1(2), . . . 1(N) is collectively defined as a DSP stage 1, and the slotted bus 2(1), 2(2), . . . 2(N-1) is collectively defined as the slotted bus 2, which is a bi-directional bus. Each DSP stage 1(1), 1(2), . . . 1(N) as a data processing stage includes multiple processing elements (i.e., PEs) 3(1, 1), 3(1, 2), . . . 3(1, M), . . . 3(N, M), a stage memory 4, and an event controller (i.e., EVETC) 5. Each 3(1, 1), 3(1, 2), . . . 3(1, M), . . . 3(N, M) is collectively defined as a PE 3. Each PE 3 and the stage memory 4 are connected to each other via a data read only bus 6. Here, the PE 3 includes, for example, a DSP.

The DSP stage 1 is connected to the slotted bus 2 via an access point 7. Each PE 3 and the access point 7 are connected to each other via the data write only bus 8. The access point 7 and the stage memory 4 are connected to each other via a data write only bus 9. The slotted bus 2 includes a right direction bus 2R and a left direction bus 2L. The right direction bus 2R transmits data to a right direction of the drawing in FIG. 1. The left direction bus 2L transmits the data to a left direction of the drawing in FIG. 1. The left direction bus 2L is independent from the right direction bus 2R.

Figure 2A:
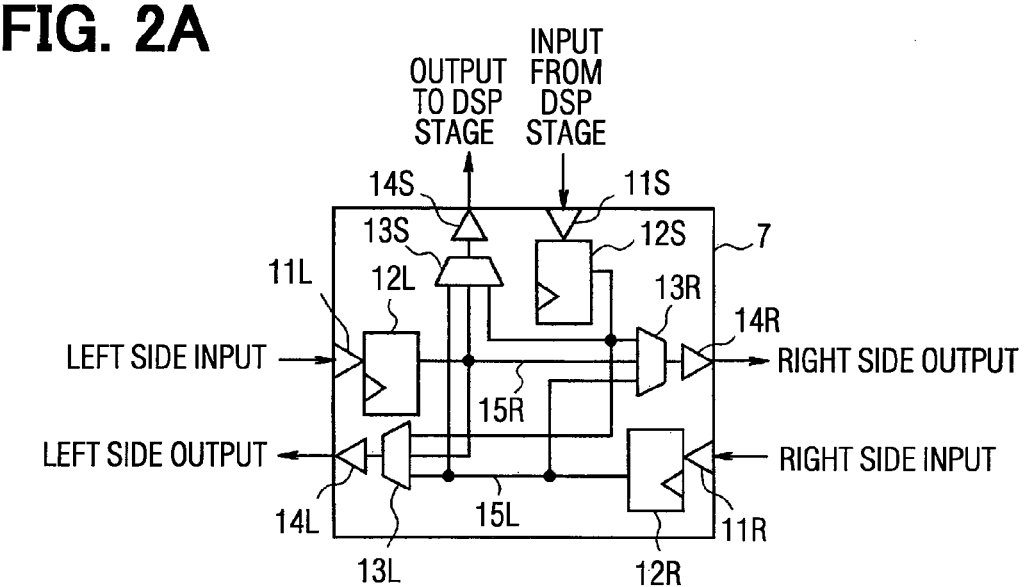
FIGS. 2A and 2B are diagrams showing constructions of an access point.

As shown in FIG. 2A, the access point 7 includes three data input ports and three data output ports. The access point 7 further includes three input buffers 11S, 11L, 11R, three data latches 12S, 12L, 12R, three multiplexers 13S, 13L, 13R, and three output buffers 14S, 14L, 14R, which correspond to the data input ports and the data output ports.

The data input via the write only bus 8 (i.e., a second data bus) of the DSP stage 1 is latched to the data latch 12S via the input buffer 11S. The output terminal of the data latch 12S is connected to one of three input terminals of three-input multiplexer 13S, 13L, 13R. The data input from the slotted bus 2R, which is connected to the left side of the drawing of FIG. 1, is latched to the data latch 12L via the input buffer 11L. The output terminal of the data latch 12L is connected to the other one of input terminals of the multiplexers 13S, 13L, 13R via the right direction bus 15R.

The data input from the slotted bus 2L, which is connected to the right side of the drawing of FIG. 1, is latched to the data latch 12R via the input buffer 11R. The output terminal of the data latch 12R is connected to the remaining one of the input terminals of the multiplexer 13S, 13L, 13R via the left direction bus 15L. The output terminal of the multiplexer 13S, 13L, 13R is connected to the input terminal of the output buffer 14S, 14L, 14R, respectively.

The output terminals of the output buffers 14S, 14L, 14R are connected to the write only bus 9 of the DSP stage 1, the left direction bus 2L connected to the left side of the access point 7, the right direction bus 2R connected to the right side of the access point 7, respectively. Here, the data control unit (not shown) of the access point 7 executes a latch control operation of the data latch 12, the selection control operation of the multiplexer 13 and enable control operation of the output buffer 14. A direction, to which the input data is output, is determined by an address attached to the data.

Thus, the data output to the write only bus 8 by the PE 3 is capable of outputting to the right direction bus 2R via the multiplexer 13R and the output buffer 14R. Further, the data output to the write only bus 8 by the PE 3 is capable of outputting to the left direction bus 2L via the multiplexer 13L and the output buffer 14L. Further, the data output to the write only bus 8 by the PE 3 is capable of outputting to the write only bus 9 of the DSP stage 1 via the multiplexer 13S and the output buffer 14S. Each PE 3 writes the data in the stage memory 4 of the DSP stage 1 along these routes.

When the data is output via the access point 7, and the collision with the writing operation of other stage occurs, the data is output in turn according to the priority order, which is determined by an adjusting method such as a Round-Robin method.

Figure 2B:
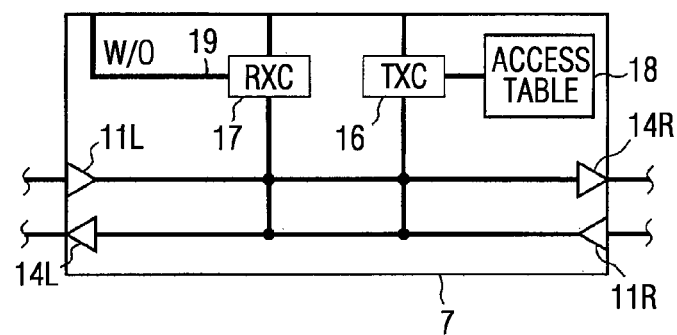

The data latch 12S, the multiplexer 13R and the multiplexer 13L shown in FIG. 2A provide a TXC 16 as a transmitting controller shown in FIG. 2B. The data latches 12L, 12R and the multiplexer 13S provide a RXC 17 as a receiving controller. Further, the TXC 16 is connected to the access table 18. The RXC 17 is connected to the event controller 5 via the write only bus 19. Here, the write only bus 19 is not shown in FIGS. 1 and 2.

Figure 3:
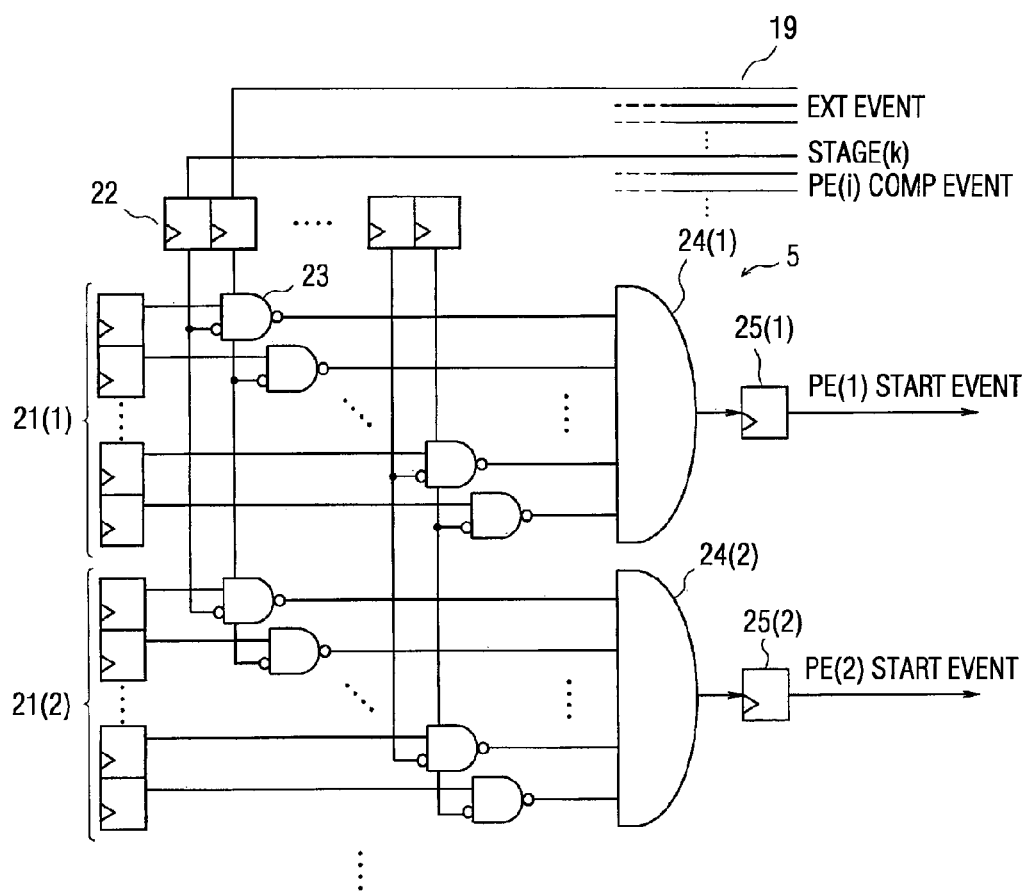
FIG. 3 is a diagram showing a construction of an event controller.

As shown in FIG. 3, the event controller 5 includes a PE event selection unit 21(1), 21(2), . . . 21(M), which corresponds to each PE 3(1, 1), 3(1, 2), . . . 3(1, M) and a complete event list unit 22. Each PE event selection unit 21(1), 21(2), . . . 21(M) is collectively defined as a PE event selection unit 21. Each of the PE event selection unit 21 and the complete event list unit 22 includes the same number of flip-flop circuits. The controller 5 further includes the same number of NAND gates 23. One of the input terminals of the NAND gate 23 is connected to the output terminal of the flip-flop circuit on the PE event selection unit side. The other of the input terminals of the NAND gate 23, which is a negative logic terminal, is connected to the output terminal of the flip-flop circuit on the complete event list unit side. The input terminal of the flip-flop circuit is connected to the RXC 17 in FIG. 2B via the write only bus 19.

The output terminal of each NAND gate 23 is connected to the input terminal of a multi-input AND gate 24(1), 24(2), . . . 24(M) corresponding to each PE 3(k, 1), 3(k, 2), . . . 3(k, M). Here, k represents the number between 1 and N. The output terminal of each AND gate 24(1), 24(2), . . . 24(M) is connected to the input terminal of the flip-flop circuit 25(1), 25(2), . . . 25(M). Each AND gate 24(1), 24(2), . . . 24(M) is collectively defined as a AND gate 24, and each flip-flop circuit 25(1), 25(2), . . . 25(M) is collectively defined as a flip-flop circuit 25.

When each PE 3 starts to execute a corresponding task process, the PE event selection unit 21 preliminary selects an event, which is executed by another PE 3 and necessary to be completed, or which is another external event and necessary to be completed. The selection is preliminary performed by a host device described later. Here, a not-selected event has an output, which is a low level. Thus, the output of the corresponding NAND gate 23 is a high level even if the corresponding event is not completed. On the other hand, since the output of the selected event is a low level, the output of the corresponding NAND gate 23 is a high level when the corresponding event is completed.

When all of events preliminary selected by the PE 3 are completed, the output of the corresponding AND gate 24 becomes a high level, and the event start information (i.e., the task start event information) is notified as an interruption to the PE 3 via the flip-flop circuit 25. The PE 3 receiving the notification starts to execute the task, which is required to execute.

Figures 4, 5:
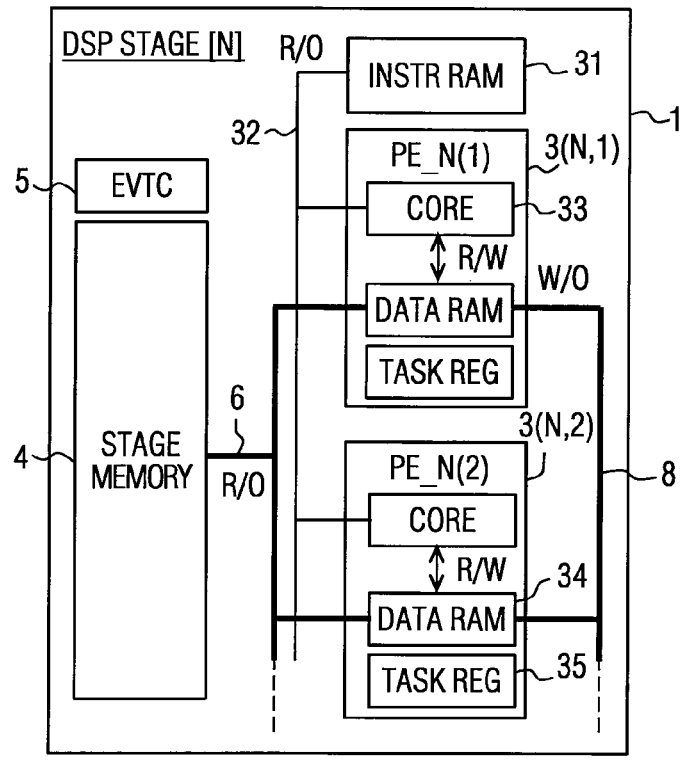
FIG. 4 is a diagram showing an inner construction of a PE.
FIG. 5 is a diagram showing a programming example of a SIMD model.

As shown in FIG. 4, the DSP stage 1 includes an instruction memory 31, which is a common memory among the PEs 3. The memory 31 is a RAM. Each PE 3 and the instruction memory 31 are connected to each other via the read only bus 32. The PE 3 includes a local data memory 34 as a data RAM, and a task control register 35 as a Task REG or a task control memory. The core 33 is connected to the read only bus 32.

Each PE 3 reads out the same program from the instruction memory 31, and then, executes the program. An individual task control such as control of an address of data to be processed by the task is performed in accordance with a register value stored in the task control register 35. For example, the task number is stored in the task control register 35, and the data to be processed is loaded from the address of "OFFSET+(task number)." Here, the "OFFSET" means the head address of array.

The above programing model is defined as a SPMD (single program multiple data). The SPMD is suitably used for a massively parallel processing such as an image processing. The SPMD is effective to simplify the hardware. FIG. 5 shows an example of the SPMD. In FIG. 5, the ID shown as "TASK_ID" is used for the index of the array as a calculation object.

Figure 6:
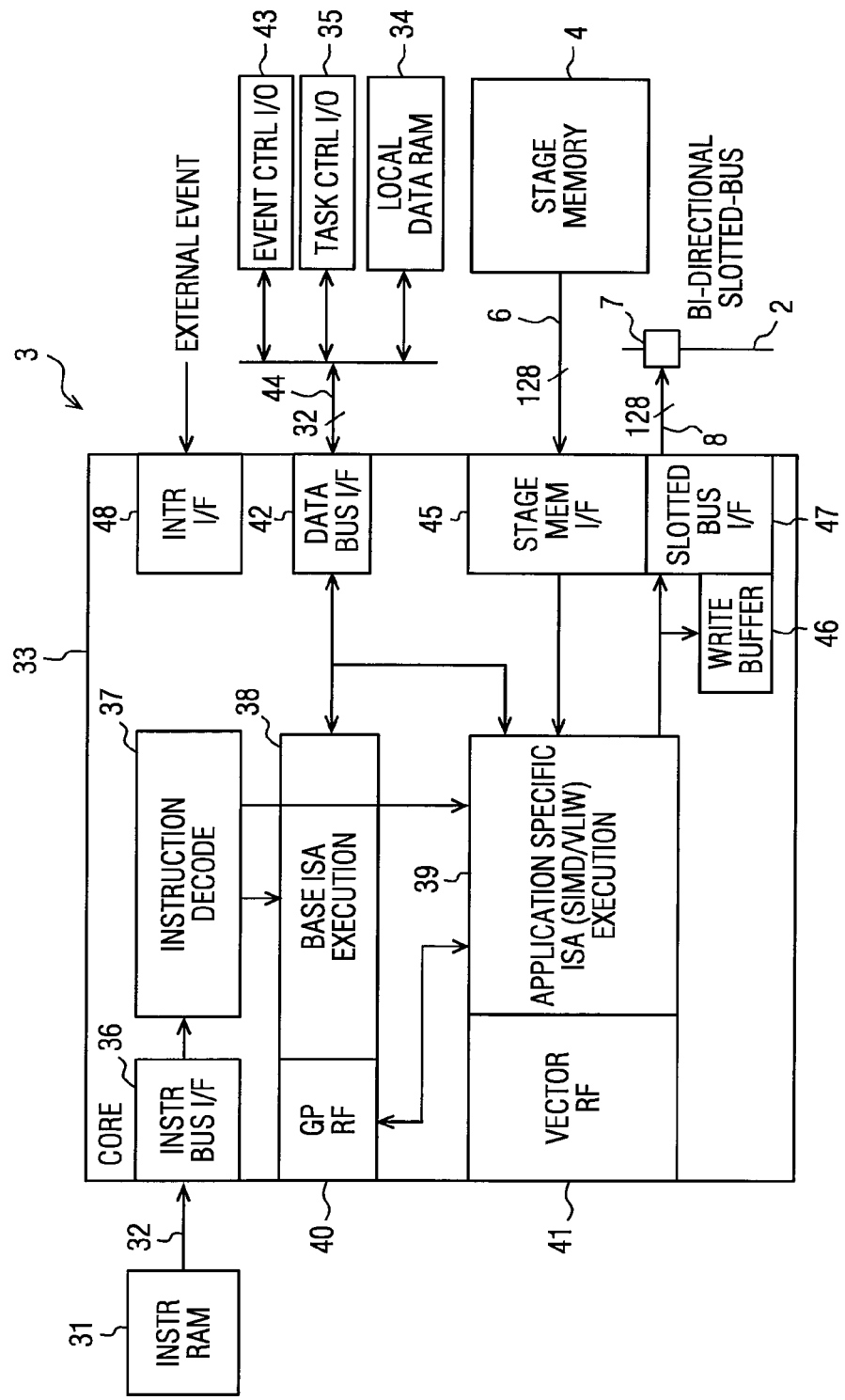
FIG. 6 is a diagram showing an inner construction of a core of the PE.

As shown in FIG. 6, when the core 33 of the PE 3 fetches the instruction from the instruction memory 31 via the instruction bus interface (I/F) 36, the core 33 decodes the instruction with using the instruction decoder 37. The core 33 includes two execution units 38, 39, which are a base instruction set (i.e., Base ISA) execution unit 38 as a first execution unit and an application specific instruction set (i.e., Application Specific ISA) execution unit 39 as a second execution unit. The instruction is sorted between two execution units 38, 39 according to the decoded result of the instruction decoder 37. The application specific instruction set execution unit 39 executes the SIMD instruction and a VLIW (very long instruction word) instruction. Further, the unit 39 includes a general purpose register file (i.e., GPRF) 40 and a vector register file 41. The general purpose register file 40 is used for the execution units 38, 39 commonly. The vector register file 41 is referred by only the execution unit 39.

The base instruction set execution unit 38 accesses the local data memory 34, the task control register (task ctrl I/O) 35 and the event control register 43 via the data bus interface 42. The size of the local data bus 44 as a first data bus for connecting between these elements is 32 bits. The application specific instruction set execution unit 39 accesses the stage memory 4 via the stage memory interface 45. The size of the read only bus 6 and the size of the write only bus 8 as a second bus are 128 bits.

Further, the application specific instruction set execution unit 39 accesses the local data memory 34 or the like via the data bus interface 42. Further, the application specific instruction set execution unit 39 accesses the slotted bus 2 via the write buffer 46, the slotted bus interface 47 and the access point 7. The size of the slotted bus 2 is also 128 bits. The event completion interruption generated at the event controller 5 is input into the interruption interface (INTR) 48 of the core 33.

Figure 7:
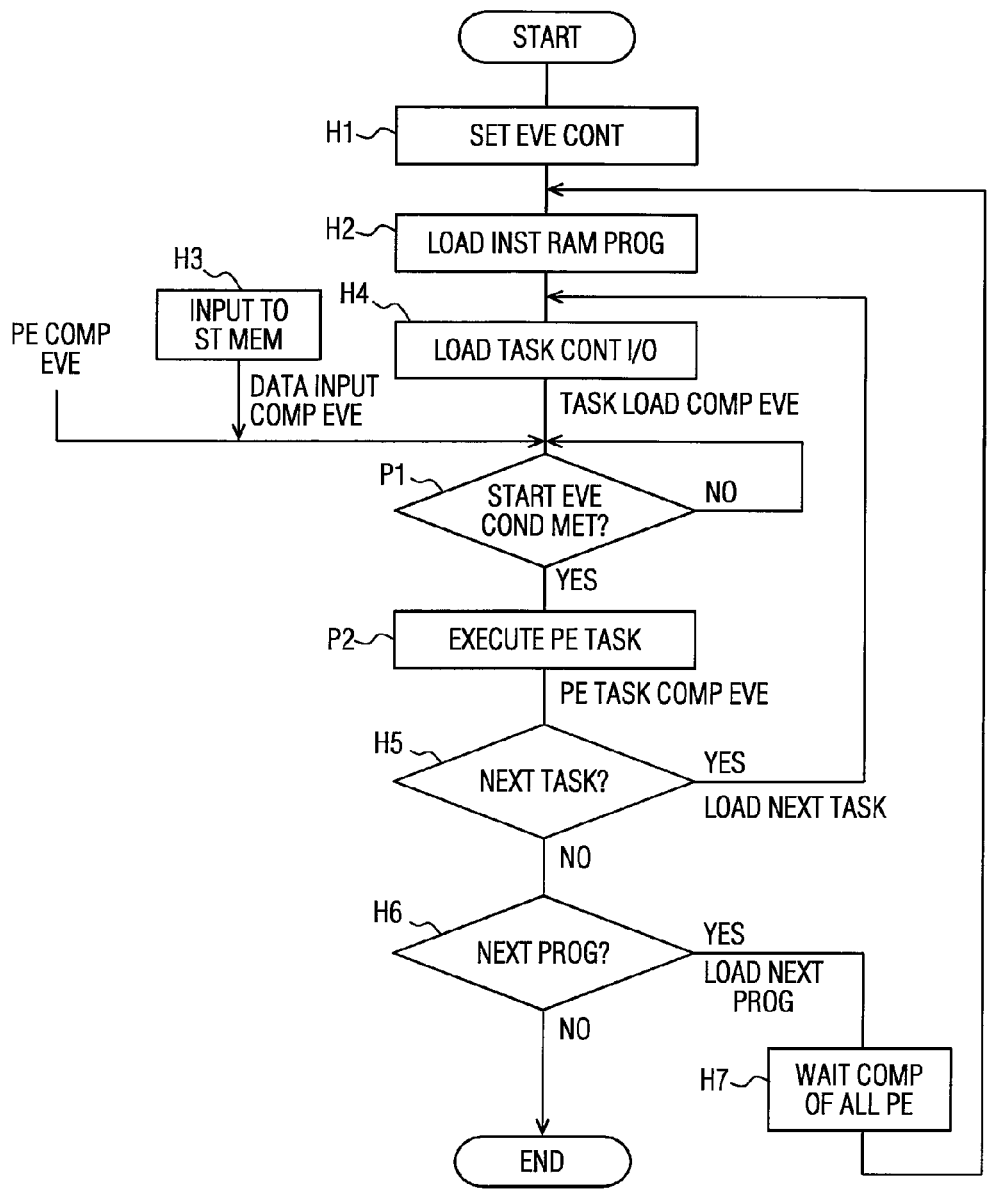
FIG. 7 is a flowchart showing a series process of a host device and the PE.

Next, functions of the data processing device according to a first embodiment will be explained. The host device in FIG. 7 corresponds to the external module in FIG. 1. The host device totally controls the execution of the task by the PE 3 at each DSP stage 1. The host device selects an event of the event controller 5 at each DSP stage 1 in order to wait for a completion of the event at step H1 using the PE event selection unit 21 corresponding to each PS 3. Then, at step H2, the program is loaded to the instruction memory 31 at each DSP stage 1. The, at step H3, the data is input into the stage memory 4. Then, at step H4, the register value is loaded to the task control register 35.

Each PE 3 stands by at step P1 until an event condition for starting to execute each task is met. When all of the completion events of other selected PEs 3 and/or the completion event from the outside occurs, and the interruption of the PE start event occurs at the PE 3 (i.e., when the determination at step P1 is "YES"), it goes to step P2. At step P2, the PE 3 starts to execute the task, which is assigned to the PE 3. Then, when the PE 3 completes to execute the task, the PE 3 generates the task completion event.

The occurrence of the task completion event is notified to the host device. Then, the host device determines at step H5 whether the PE 3, which has generated the event, has a next task to be processed. When the PE 3 has the next task, i.e., when the determination of step H5 is "YES," it returns to step H4. At step H4, the register value indicative of the next task to be processed is loaded to the corresponding task control register 35. On the other hand, when the PE 3 does not have the next task, i.e., when the determination of step H5 is "NO," it goes to step H6. At step H6, it is determined whether the PE 3 at the corresponding DSP stage 1 has a next program to be executed. When the PE 3 has the next program, i.e., when the determination at step H6 is "YES," it goes to step H7. At step H7, the host device stands by until all of PEs 3 in the corresponding DSP stage 1 complete to execute tasks, respectively. Then, it goes to step H2, and the next program is loaded. When the PE 3 does not have the next program, i.e., when the determination at step H6 is "NO," the host device ends the process. Thus, the process executed by the data processing device is described.

Figure 8:
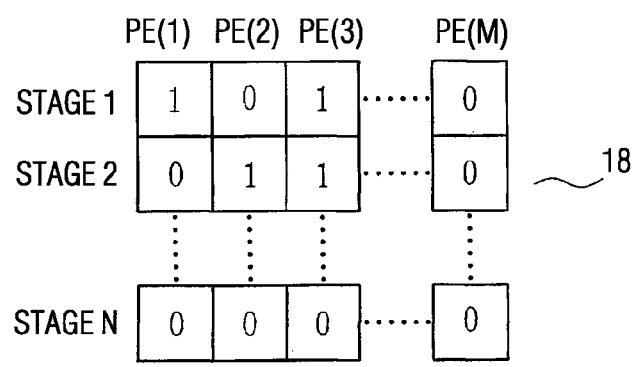
FIG. 8 is a diagram showing an example of an access table.

Next, a memory access (i.e., MA) to the stage memory 4 executed by each PE 3 an event access (i.e., EA) executed by each PE 3 will be explained as follows. The PE 3 performs the MA to the stage memory 4, which is an object for writing data therein. After the PE 3 writes the data to the stage memory 4, the PE 3 executes the EA. As shown in FIG. 8, the access table 18 shows a matrix having rows defined by the number of the DSP stages 1(1), 1(2), . . . 1(N) and columns defined by the number of PE 3(k, 1) to 3(k, M). Here, k represents the number between 1 and N. For example, when the PE 3(1, 1) accesses the memory 4 at the DSP stage 1(1), a flag of a corresponding matrix element is set to be "1." After that, when the PE 3(1, 1) executes the EA, the flag is returned to be "0" using the TXC 16.

Figure 9:
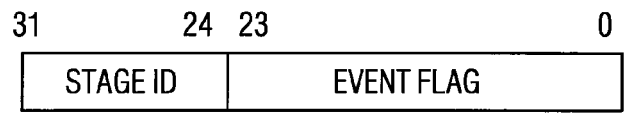
FIG. 9 is a diagram showing an example of a EA data format.

The PE 3 executes the EA by writing to the specific address, which is preliminary assigned. Thus, the TXC 16 refers the access table 18, and the TXC 16 issues EA data having a format shown in FIG. 9 in accordance with information which stage memory 4 the corresponding PE 3 accesses to until the present time. The EA data has a 32-bit constitution, for example. A part of the EA data having 8 bits on the MSB side specifies the number of the DSP stage, and the other part of the EA data having 24 bits specifies the PE 3 to generate the event and the type of the completion event. Thus, in the event controller 5 at the corresponding DSP stage 1, the event flag is set at one of the completion event list unit 22 in the corresponding PE 3.

Figure 10:
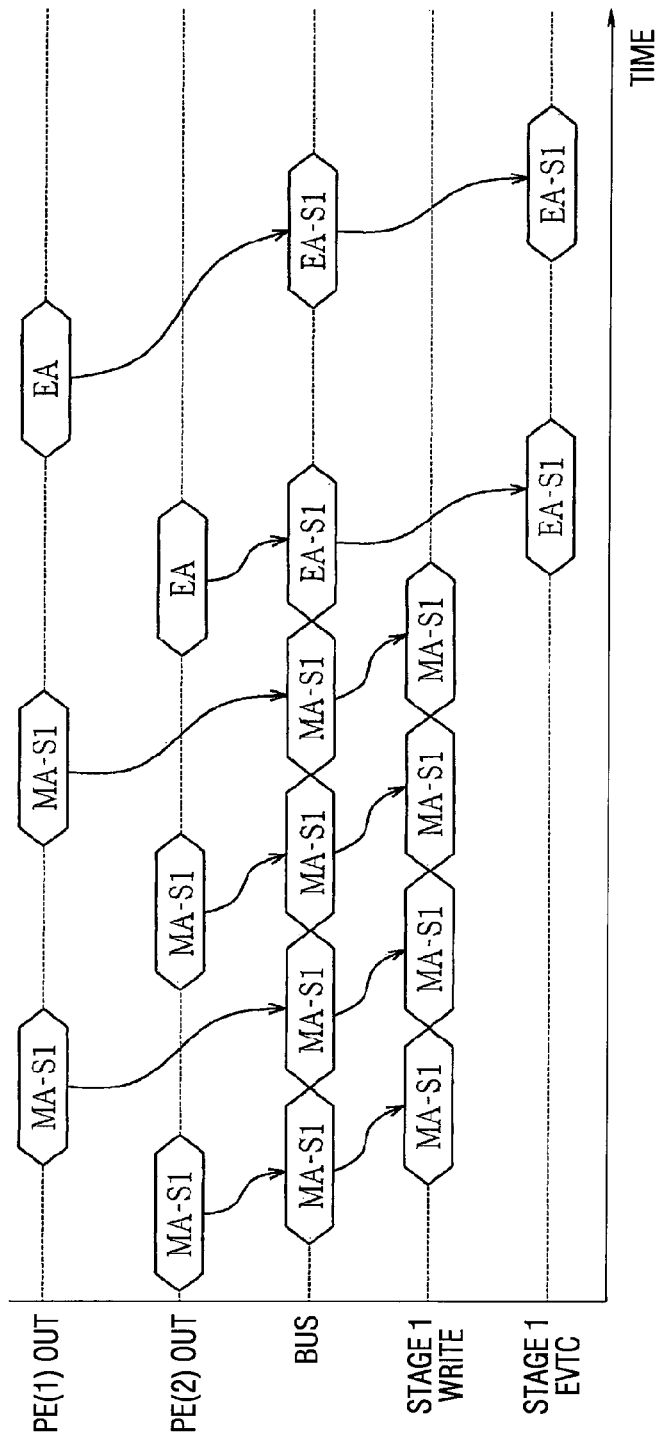
FIG. 10 is a timing chart showing a case where two PEs perform a MA operation and a EA operation, respectively.

For example, as shown in FIG. 10, firstly, the PE 3(1, 2) executes the MA to the memory 4 at the DSP stage 1(1). Then, the PE 3(1, 1) executes the MA to the same stage memory 4 at the DSP stage 1(1). Then, the PE 3(1, 2) executes the MA to the same stage memory 4 at the DSP stage 1(1). After that, the PE 3(1, 2) executes the EA, so that the TXC 16 at the DSP stage 1(1) refers to the access table 18. Thus, it is determined that the PE 3(1, 2) executes the MA to the DSP stage 1(1) until the present time. Thus, the TXC 16 executes the EA with respect to the DSP stage 1(1), so that the TXC 16 issues the EA data. As a result, in the event controller 5 at the corresponding DSP stage 1, the event flag is set at one of the completion event list unit 22 of the corresponding PE 3. After that, when the PE 3(1, 1) executes the EA, the same processing as above is executed.

Figure 11:
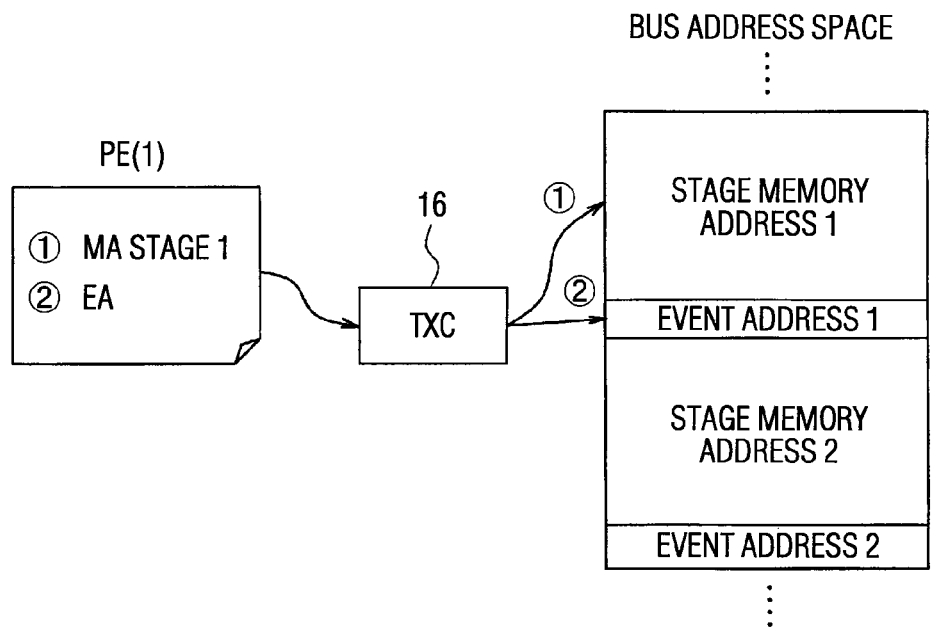
FIG. 11 is a diagram showing an address in a bus address space when the PE performs the MA operation and the EA operation.
Figure 12:
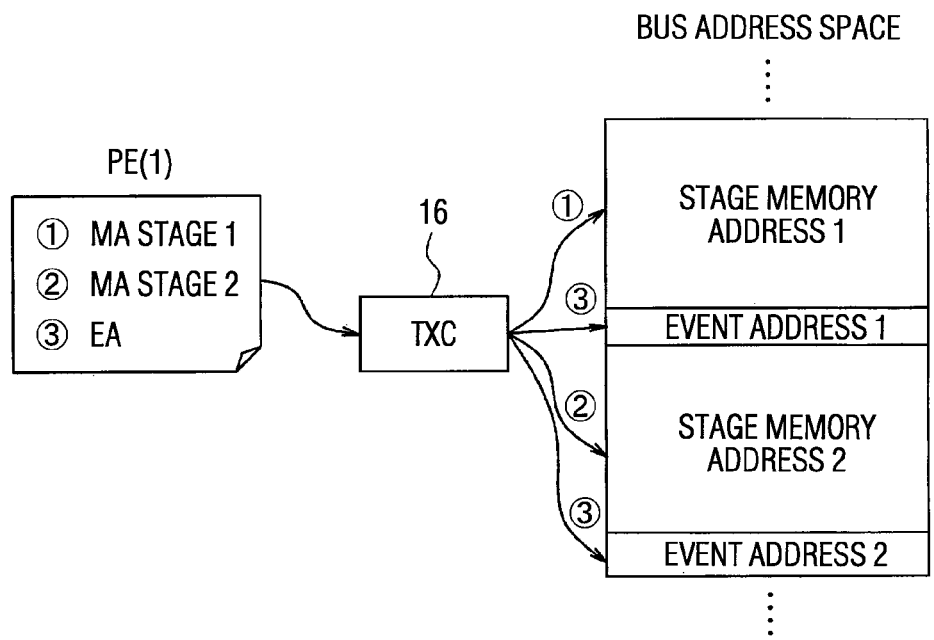
FIG. 12 is a diagram showing the address in the bus address space when the PE performs the MA operation and the EA operation.

As shown in FIG. 11, when the PE 3(1, 1) executes the MA to the memory 4 of the DSP stage 1(1), the writing address (i.e., the address in the bus address space) with respect to the memory 4 is output through the TXC 16. Then, when the PE 3(1, 1) executes the EA, the TXC 16 outputs the address for accessing the event controller 5 of the DSP stage 1(1). Further, as shown in FIG. 12, when the PE 3(1, 1) executes the MA to the memory 4 at the DSP stage 1(1) and the memory 4 at the DSP stage 1(2), the writing address with respect to each memory 4 of the DSP stages 1(1), 1(2) is output through the TXC 16. After that, when the PE 3(1, 1) executes the EA, the TXC 16 outputs the address for accessing each event controller 5 of the DSP stages 1(1), 1(2).

Figure 13:
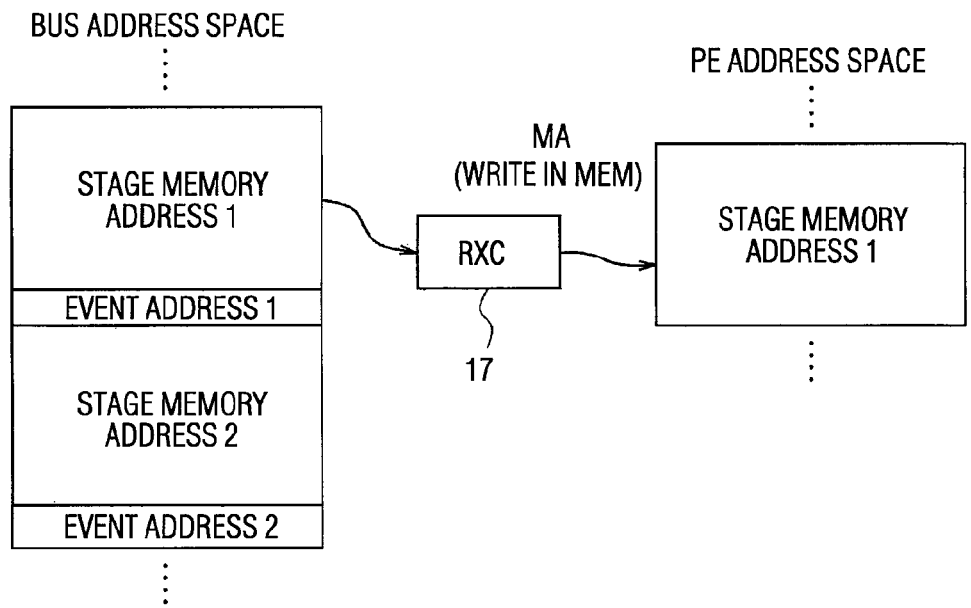
FIG. 13 is a diagram showing an address in a PE address space when the PE performs the MA operation.
Figure 14:
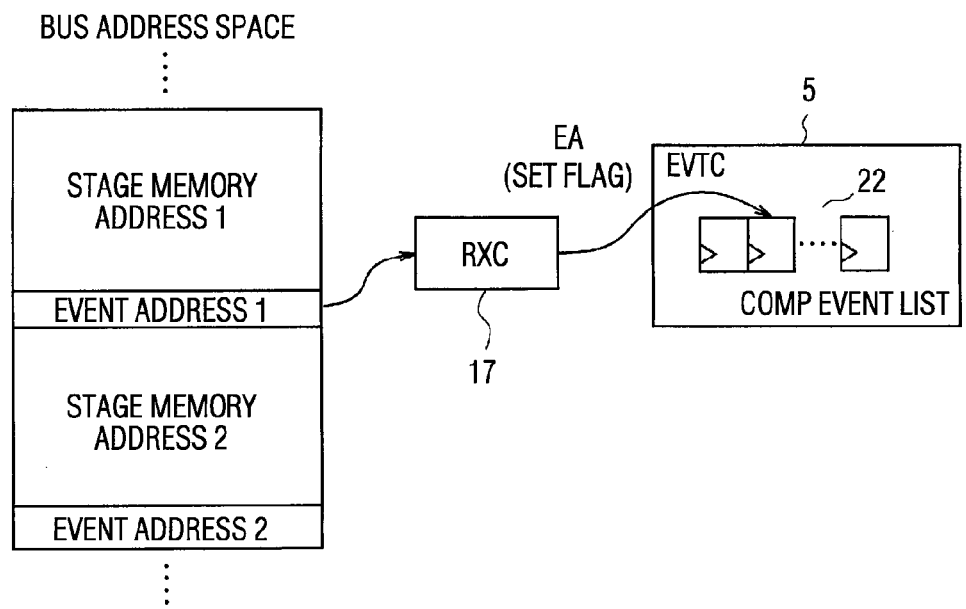
FIG. 14 is a diagram showing an address in a PE address space when the PE performs the EA operation.

As shown in FIG. 13, in a case shown in FIG. 11, when the writing address with respect to the memory 4 of the DSP stage 1(1) is output, the data is written in the memory 4 via the RXC 17 of the DSP stage 1(1). When the EA to the DSP stage 1(1) is executed, as shown in FIG. 14, the event flag is set in one of the completion event list unit 22 at the event controller 5 of the DSP stage 1(1) through the RXC 17.

Thus, in the present embodiment, each DSP stage 1 includes multiple PEs 3, the stage memory 4 and the event controller 5. The slotted bus 2 connects among multiple DSP stages 1. In one of the DSP stages 1, the PE 3 and the stage memory 4 are connected to each other via the read only bus 6, and the PE 3 and the slotted bus 2 are connected to each other via the write only bus 8. The external event, which is generated by an external device, and/or the process completion event from the PE 2 are input into the event controller 5. The event controller 5 generates the task start event with respect to the PE 3 at the one of the DSP stages 1 according to each event inputted therein.

The PE 3 in the DPS stage 1 reads out the data as a processing object from the stage memory 4 via the read only bus 6. The processed data is written in the memory 4 of another one of the DSP stages 1 via the slotted bus 2, which is a write only bus. Thus, the data transfer direction between the PE 3 and the memory 4 is fixed. Further, the coherency management of the memory 4 is performed by generating the event at the another one of the DSP stages 1 via the access point 7 and the event controller 5 after each PE 3 writes in the memory 4 of the another one of the DSP stages 1. Thus, the area of the hardware is reduced, and the processing speed is improved.

Further, the two-way (bidirectional) slotted bus 2 including two busses 2L, 2R, which are independent from each other, and have different data writing directions, has a structure, which executes the pipeline process of the software and is designed with high designing degree of freedom compared with a single data writing direction ring bus described in non-patent literature No. 1. Accordingly, various algorisms are provided by the same hardware. Thus, the hardware resource is much effectively used, so that the energy consumption is reduced.

The common instruction memory 31 is arranged with respect to multiple PEs 3. Each PE 3 includes a local data memory 34, and a task control register 35, respectively. The task control register 35 individually controls the task, which is executed by each PE 3. Thus, the SPMD programming model is introduced, and the optimum programming for a process such as an image processing is performed.

The PE 3 includes the base instruction set execution unit 38 for processing one piece of data with respect to one instruction and the application specific instruction set execution unit 39 for processing multiple pieces of data in parallel with respect to one instruction. The base instruction set execution unit 38 is connected to the local data memory 34 via the local data bus 44. The application specific instruction set execution unit 39 is connected to the memory 34 via the local data bus 44. Further, the application specific instruction set execution unit 39 is connected to the slotted bus 2 via the write only bus 8 having a bus capacity (i.e., a bus bandwidth) larger than the local data bus 44. Thus, the increase of the circuit area is restricted, and the processing speed of the application specific instruction set execution unit 39 is improved. The valance between the reduction of the circuit area and the improvement of the processing speed is appropriately controlled.

Second Embodiment

Figure 15:
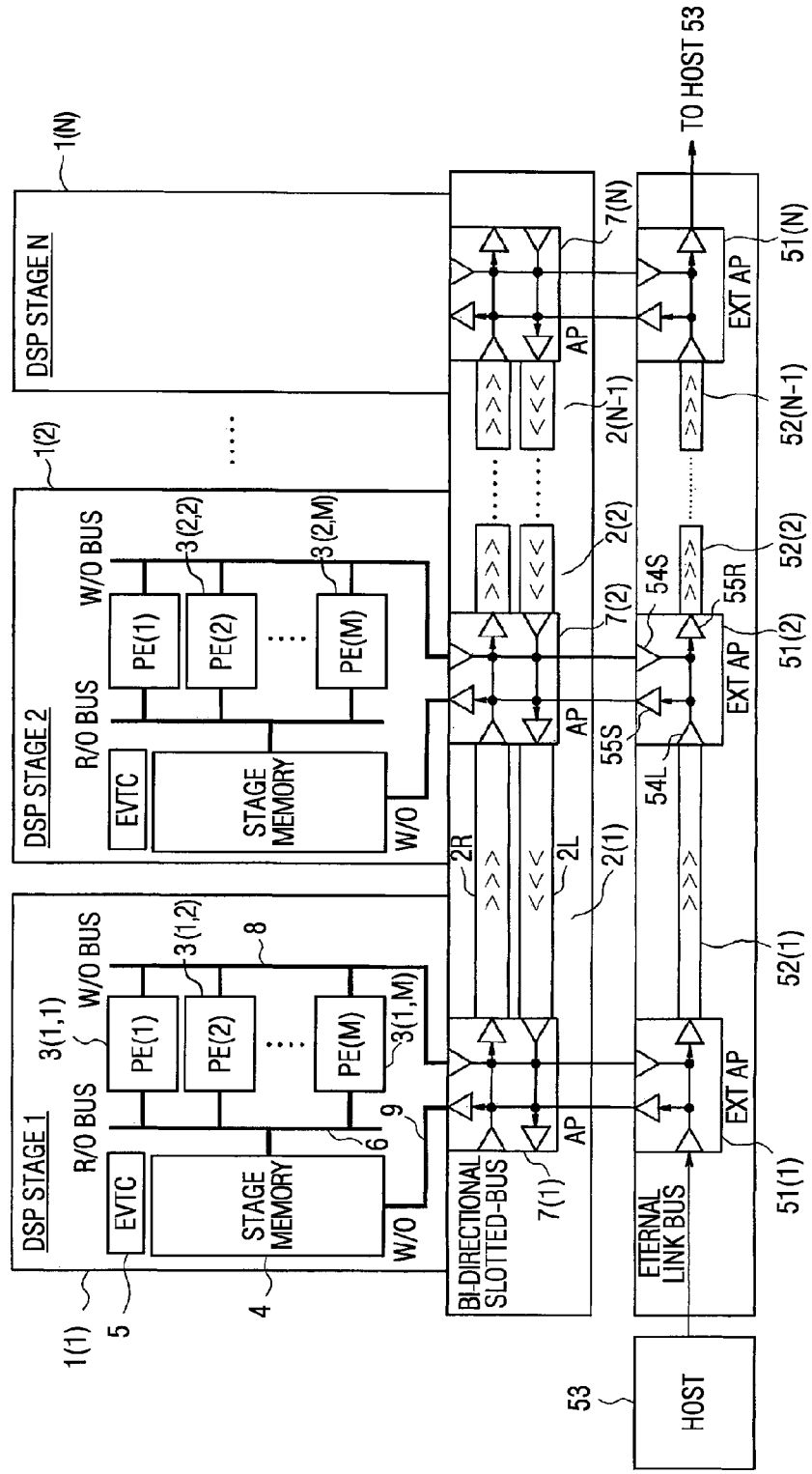
FIG. 15 is a block diagram showing a functional structure of a data processing device according to a second embodiment.

As shown in FIG. 15, in the second embodiment, the external link bus 52(1), 52(2), . . . 52(N-1) as an external connection bus is connected to the access point 7 via an external access point 51 (1), 51(2), . . . 51(N). Each external link bus 52(1), 52(2), . . . 52(N-1) is collectively defined as an external link bus 52, and each external access point 51 (1), 51(2), . . . 51(N) is collectively defined as an external access point 51. The external link bus 52 is connected to the host device 53 as an external module. The external access point 51 includes input buffers 54L, 54S and output buffers 55R, 55S. An output terminal of the input buffer 54L, 54S is connected to an input terminal of the output buffer 55R, 55S.

The data output port of the host device 53 is connected to an input terminal of the input buffer 54L of the external access point 51(1). The data input port of the host device 53 is connected to an output terminal of the output buffer 55R of the external access point 51(N). Thus, the external link bus 52 is a single direction bus for transferring data from a left side of the drawing of FIG. 15 to a right side. The host device 53 writes data in the memory 4 of each DSP stage 1 via the external access point 51 and the external link bus 52 and receives data output from the PE 3 via the external access point 51 and the external link bus 52.

In the above case, the host device 53 may set the access right of the slotted bus 2 to be the highest. Alternatively, the device 53 gives the access right of the slotted bus 2 in a round Robin manner similar to the PE 3 of each DSP stage 1.

Thus, in the second embodiment, the DSP stage 1 is connected to the external link bus 52 for transmitting writing data to the external device and transferring writing data from the external device. Specifically, the external link bus 52 is connected to the slotted bus 2 via the external access point 51. Thus, the structure of the data processing device is easily expandable, and the execution of the task at each DSP stage 1 is totally controlled by the host device 53.

Third Embodiment

Figure 16:
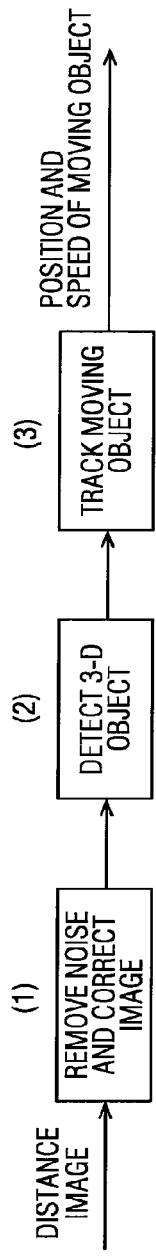
FIG. 16 is a diagram showing an example of an application processed by the data processing device according to a third embodiment.

The data processing device according to the third embodiment, as shown in FIG. 16, executes a process including:
(1) removing a noise from a distance image data obtained by an image sensor so as to correct the data;
(2) then, detecting a three-dimensional object included in the image data; and
(3) tracking the three-dimensional object when the detected three-dimensional object is moving.

When the device executes the process of steps (1) to (3), the construction of the PE 3 mounted on the DSP stage 1 for executing each process is designed to be suitable for each process, so that the process efficiency is improved.

Figure 17:
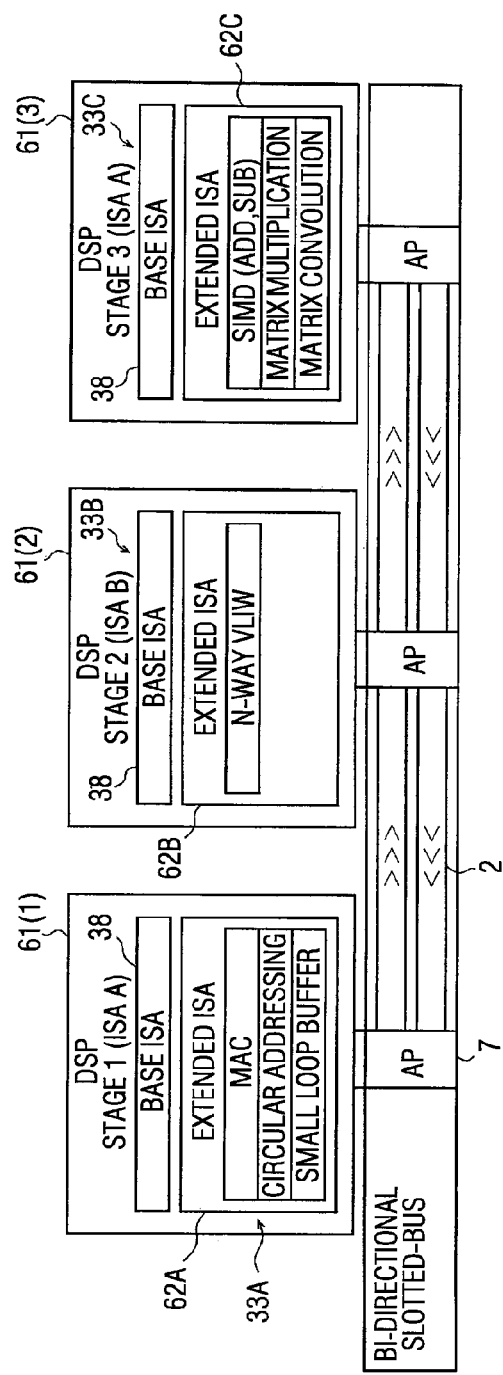
FIG. 17 is diagram showing the data processing device corresponding to the application in FIG. 16.

As shown in FIG. 17, there are three DSP stages 61(1), 61(2), 61(3) corresponding to three steps (1) to (3), respectively. Each DSP stage 61(1), 61(2), 61(3) is collectively defined as a DSP stage 61. The PE 3 mounted on each DSP stage 61 includes a core 33A, 33B, 33C having a different structure from each other. Each core 33A, 33B, 33C is collectively defined as a core 33. Each core 33 has the common base instruction set execution unit 38. An expanded instruction execution unit 62A, 62B, 62C as a second execution unit has a different structure. Each expanded instruction execution unit 62A, 62B, 62C is collectively defined as an expanded instruction execution unit 62, which is a displacement of the application specific instruction set execution unit 39.

The core 33A of the DSP stage 61(1) repeatedly executes a simple filtering calculation of the noise removing process. Thus, the expanded instruction execution unit 62A includes a structure for executing a multiply and accumulate operation (i.e., MAC operation) and executing a circular addressing operation for referring to a coefficient of the filter, and a loop buffer. The core 33B of the DSP stage 61(2) executes a three-dimensional object detecting process. In the three-dimensional object detection process, since parallelization of the SIMD calculation may be difficult, it is effective to execute multiple instructions with a VLIW so as to speed up the calculation.

Further, in a moving object tracking process executed by the core 33C of the DSP stage 61(3), various matrix instructions corresponding to a Kalman filtering calculation or the like are executed, so that the calculation speed is improved. In this case, each PE is specialized according to an application program so that the PE has a heterogeneous structure.

In the third embodiment, the core 33 of the PE 3 mounted on each DSP stage 61 has a different architecture according to a process property of the stage 61. Thus, the processing efficiency in accordance with the application is improved.

Fourth Embodiment

Figure 18:
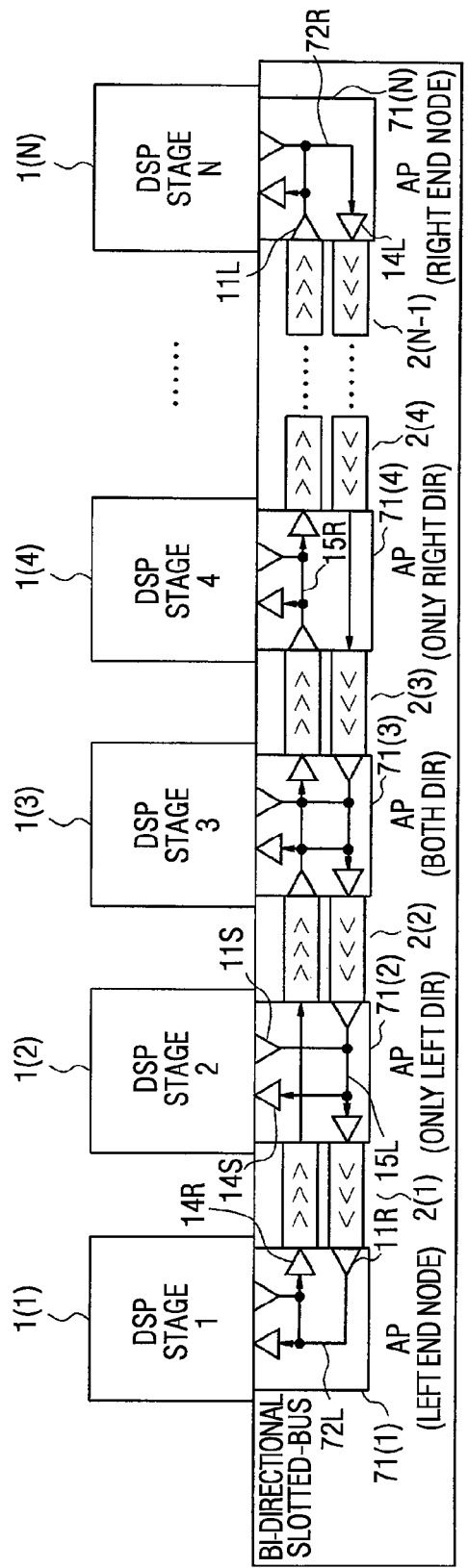
FIG. 18 is a block diagram showing a functional structure of a data processing device according to a fourth embodiment.

In the fourth embodiment, as shown in FIG. 18, the access point 71 connected to each DSP stage 1 has a different structure, i.e., all of the point 71 do not have the same structure. The structure of the point 71 is preliminary optimized according to the process property of each DSP stage 1. For example, the access point 71(1) disposed on the left end of the drawing of FIG. 18 does not include an input buffer 11L, an output buffer 14L, a data latch 12L, a multiplexer 13L. The data input via the input buffer 11R is input into the DSP stage 1(1), or is output to and back to the right direction via the output buffer 14R. Thus, the loop path 72L is constructed at the point 71(1). Here, in the access point 71 shown in FIG. 18, only the buffer is shown, and the data latch 12 and the multiplexer 13 are not shown.

The access point 71(2) arranged on the right side of the point 71(1) does not include an input buffer 11L, an output buffer 14R, a data latch 12L, and a multiplexer 13R. The data input from the left side is output to the right side directly. The data input via the input buffer 11S is only output to the left direction bus 15L. Further, the input terminal of the output buffer 14S is only connected to the left direction bus 15L. The access point 71(3) arranged next to the point 71(2) has the same structure as the access point 7.

The access point 71(4) arranged next to the point 71(3) does not include an input buffer 11R, an output buffer 14L, a data latch 12R, and a multiplexer 13L. The data input from the right side is output to the left side directly. The data input via the input buffer 11S is output to only the left direction bus 15R. The input terminal of the output buffer 14S is connected to only the left direction bus 15R.

The access point 71(N) arranged on the right end of the drawing of FIG. 18 does not include an input buffer 11R, an output buffer 14R, a data latch 12R and a multiplexer 13R. The data input via the input buffer 11L is input into the DSP stage 1(N), or is output to and back to the left direction via the output buffer 14L. Thus, a loop path 72R is constructed at the access point 71(N). Accordingly, the slotted bus 2 connected to the access point 71 has a ring bus structure.

In the fourth embodiment, the access point 71(1) of the DSP stage 1(1) arranged on one end includes the loop path 72L for outputting and turning back the data, which is input from an adjacent access point 71(2), to the access point 71(2). Further, the access point 71(N) of the DSP stage 1(N) arranged on the other end includes the loop path 72R for outputting and turning back the data, which is input from an adjacent access point 71(N-1), to the access point 71(N-1). The access points 71(2), 71(3), . . . 71(N-1) of the DSP stages 1(2), 1(3) . . . 1(N-1) arranged between the access point 71(1) and the access point 71(N) has a structure for inputting and outputting data to be transferred in both directions via the slotted bus 2 in a corresponding stage 1(2), 1(3), . . . 1(N-1) or a structure for inputting and outputting data to be transferred in only one direction via the slotted bus 2 in a corresponding stage 1(2), 1(3), . . . 1(N-1). One of two structures is preliminary selected.

Thus, the bus architecture specialized to an application is provided. The increase of the circuit dimensions is restricted, and the data transfer efficiency is improved. Further, in the access point 71(3), a loop path of data is formed if necessary. The data is capable of transferring and turning back to the right direction and the left direction. Accordingly, the transfer manner of data is easily changed according to the application, and the transfer efficiency is much improved.

At each DSP stage 1, at least one PE 3 may be arranged. Alternatively, multiple PEs 3 may be arranged at each DSP stage 1. Further, at each DSP stage, one or more stage memories 4 may be disposed.

The size of the local data bus 44 may be the same as the read only bus 6 and the write only bus 8.

The core of the PE 3 may not include two execution units 38, 39.

The external event may be different from the event generated at the host device 53.

The external link bus 52 may not be connected to the slotted bus 2. Alternatively, the external link bus 52 may be connected to each DSP stage 1 directly.

The host device 53 may not be the external module connected via the external link bus 52. Alternatively, one of the DSP stages 1 connected to the slotted bus 2 may execute a function of the host device 53.

The method for notifying the event may be different from a construction that accesses the DSP stage 1 as an object by referring the access table 18 using the TXC 16. Alternatively, each PE 3 may execute the EA independently with respect to the DSP stage 1, which executes the MA.

It is noted that a flowchart or the processing of the flowchart in the present application includes sections (also referred to as steps), each of which is represented, for instance, as H1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data processing device comprising:
a plurality of data processing stages, each of which includes at least one processing element, at least one stage memory and an event controller; and
a bidirectional slotted bus that connects between the data processing stages, and includes two busses, which are data write only busses and arranged at different data writing directions independently from each other,
wherein the processing element and the stage memory in one of the data processing stages are connected to each other via a read only bus,
wherein the processing element and the slotted bus in the one of the data processing stages are connected to each other via a write only bus,
wherein a process completion event is input from the processing element to the event controller in the one of the data processing stages, and an external event is input from an external device to the event controller, and
wherein the event controller generates a task start event with respect to the processing element in the one of the data processing stages, according to each of the process completion event and the external event.

2. The data processing device according to claim 1,
wherein the at least one processing element includes a plurality of processing elements and an instruction memory,
wherein each of the processing elements includes a local data memory and a task control memory, and
wherein the task control memory in each of the processing elements controls a task, which is executed by each of the processing elements, individually.

3. The data processing device according to claim 2,
wherein each of the processing elements includes a first execution unit for processing one piece of data with respect to one instruction and a second execution unit for processing a plurality of pieces of data with respect to one instruction,
wherein the first execution unit is connected to the local data memory via a first data bus,
wherein the second execution unit is connected to the local data memory via the first data bus, and the second execution unit is connected to the slotted bus via a second data bus, and
wherein the second data bus has a bus capacity larger than the first data bus.

4. The data processing device according to claim 1,
wherein the plurality of data processing stages are connected to an external connection bus for transferring write data to an external device and transferring the write data from the external device.

5. The data processing device according to claim 4,
wherein the external connection bus is connected to the plurality of data processing stages via the slotted bus.

6. The data processing device according to claim 1,
wherein the processing element mounted on each of the plurality of data processing stages has a different structure, which corresponds to a process property of each of the plurality of data processing stages.

7. The data processing device according to claim 1,
wherein each of the plurality of data processing stages is connected to the slotted bus via an access point,
wherein the access point of one of the data processing stages arranged on one end or the other end of the data processing device includes a loop path for outputting and turning back data, which is input from an adjacent access point, to the adjacent access point,
wherein the access point of another one of the data processing stages arranged between the one end and the other end of the data processing device has a first function for inputting and outputting data, which is transferred in both directions via the slotted bus, to the another one of the data processing stages, or a second function for inputting and outputting data, which is transferred in only one direction via the slotted bus, to the another one of the data processing stages, and
wherein one of the first function and the second function is preliminary selected.

8. The data processing device according to claim 7,
wherein at least the access point of the another one of the data processing stages arranged between the one end and the other end of the data processing device includes the loop path.

* * * * *